United States Patent [19]
DeLeeuw

[11] Patent Number: 5,262,956
[45] Date of Patent: Nov. 16, 1993

[54] STATISTICALLY COMPENSATED OPTIMIZATION SYSTEM

[75] Inventor: Peter H. DeLeeuw, Eugene, Oreg.

[73] Assignee: Inovec, Inc., Eugene, Oreg.

[21] Appl. No.: 721,831

[22] Filed: Jun. 26, 1991

[51] Int. Cl.$^5$ .......................... G06F 15/46; B27B 1/00
[52] U.S. Cl. ............................. 364/474.13; 364/156; 364/474.09
[58] Field of Search .............. 364/156, 474.09, 474.13, 364/554; 144/356; 33/15

[56] References Cited

U.S. PATENT DOCUMENTS

| | | |
|---|---|---|
| 3,736,968 | 6/1973 | Mason . |
| 3,746,065 | 7/1973 | Mason . |
| 3,787,700 | 1/1974 | Chasson . |
| 3,852,579 | 12/1974 | Sohn et al. . |
| 3,890,509 | 6/1975 | Maxey . |
| 3,902,539 | 9/1975 | Ketteler . |
| 3,940,998 | 3/1976 | Sourby et al. ................. 364/474.13 |
| 3,992,615 | 11/1976 | Bennett et al. . |
| 4,017,976 | 4/1977 | Barr et al. ......................... 364/156 |
| 4,197,888 | 4/1980 | McGee et al. . |
| 4,221,973 | 9/1980 | Nosler . |
| 4,397,343 | 8/1983 | Fields . |
| 4,803,371 | 2/1989 | Durland . |
| 4,867,213 | 9/1989 | Bolton et al. .................. 364/474.09 |

Primary Examiner—Long T. Nguyen
Assistant Examiner—Steven R. Garland
Attorney, Agent, or Firm—Chernoff, Vilhauer, McClung & Stenzel

[57] ABSTRACT

A method of optimizing the yield of useful material cut from a piece of raw material, such as lumber, includes considering different cutting options for cutting the piece, identifying different potential yields obtainable for each cutting option, determining the relative probability of obtaining each potential yield, and determining the relative value of each cutting option, preferably by averaging the potential yields for that option where each potential yield is statistically weighted by its relative probability. By comparing the relative values, the highest-valued cutting option is identified and cutting of the piece is performed in accordance with such option. The relative probabilities for the respective possible yields are preferably determined by empirically measured statistical attributes that characterize the uncertain variables that affect these yields and by grouping the uncertain variables into statistically significant classes, each class corresponding to a respective yield, where the relative frequency of each class is determined from the underlying statistical attributes. Alternatively, the relative probabilities are determined by using statistical attributes that are based on a statistically expected distribution.

17 Claims, 7 Drawing Sheets

| OFFSET | BASED ON A CIRCLE | | BASED ON RANGE OF ELLIPSES | | | | |
|---|---|---|---|---|---|---|---|
| | SOLUTION | VALUE | SOLUTION | | | | VALUE |
| 0.0 | ⊕ | $7.20 | ⊞ 25% | ⊞ 75% | | | $6.90 |
| 0.1 | ⊞ | $7.20 | ⊞ 30% | ⊞ 61% | ⊞ 9% | | $6.89 |
| 0.2 | ⊞ | $7.20 | ⊞ 35% | ⊞ 30% | ⊞ 35% | | $6.99 |
| 0.3 | ⊞ | $7.80 | ⊞ 35% | ⊞ 6% | ⊞ 1% | ⊞ 58% | $6.64 |
| 0.4 | ⊞ | $6.60 | ⊞ 23% | ⊞ 24% | ⊞ 50% | ⊞ 3% | $5.93 |

38 — FOR A GIVEN CUTTING OPTION, IDENTIFY THE MOST LIKELY YIELD OBTAINABLE

40 — ADOPT THE MOST LIKELY YIELD AS THE RELATIVE VALUE FOR THE GIVEN CUTTING OPTION

FIG. 7

FIG. 8a
VALUE: $6.00

FIG. 8b
VALUE: $7.20

| OFFSET | BASED ON A CIRCLE | | BASED ON RANGE OF ELLIPSES | | | | |
|---|---|---|---|---|---|---|---|
| | SOLUTION | VALUE | SOLUTION | | | | VALUE |
| 0.0 | ⊘ | $7.20 | 25% | 75% | | | $6.90 |
| 0.1 | ⊘ | $7.20 | 30% | 61% | 9% | | $6.89 |
| 0.2 | ⊘ | $7.20 | 35% | 30% | 35% | | $6.99 |
| 0.3 | ⊘ | $7.80 | 35% | 6% | 1% | 58% | $6.64 |
| 0.4 | ⊘ | $6.60 | 23% | 24% | 50% | 3% | $5.93 |

STATISTICALLY COMPENSATED OPTIMIZATION SYSTEM

BACKGROUND OF THE INVENTION

The present invention relates to optimization systems for determining how best to cut a piece of raw material, such as lumber, so as to produce the optimal yield.

For some time now, in the lumber industry, computer-driven scanning systems have been used to increase the yield of finished lumber and veneer from logs at various stages of processing. Such systems are disclosed, for example, in the following U.S. Pat. Nos. 3,736,968; 3,746,065; 3,787,700; 3,852,579; 3,890,509; 3,902,539; 3,992,615; 4,197,888; 4,221,973; 4,397,343; and 4,803,371.

In these systems, the computer is used to compute how best to cut each piece of raw material so as to obtain the highest yield. These computations are based on the measured dimensions of the piece and a model generated internally by the computer that characterizes the entire geometry of the piece. Once the computer has determined the best cutting option, this option is implemented either by computer-controlled or by manually operated cutting equipment.

In a typical set-up, for example, the log, already precut to the standard 8-foot length, rides on a headrig carriage, which resembles a small flatbed railroad car with special log clamps on top, so as to pass across an optical or other noncontact scanning array. The horizontal dimension of the log is measured by the scanner along an axis parallel to the carriage track and this measurement is processed by the computer which derives the vertical and remaining dimensions of the log based on a circular model. From the full set of parameters derived, the computer then determines which cuts to make.

Figure 1:
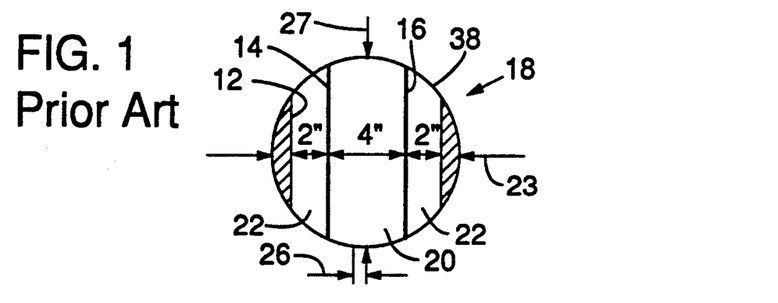
FIG. 1 is a transverse sectional view, in accordance with the prior art, indicating schematically how vertical cuts may be made in a log during initial processing.
Figure 2:
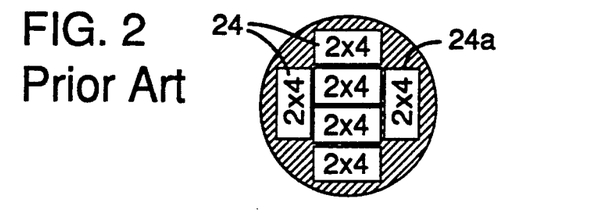
FIG. 2 is similar to FIG. 1, except showing how further cuts made in the log result in standard-shaped boards.
Figure 3:
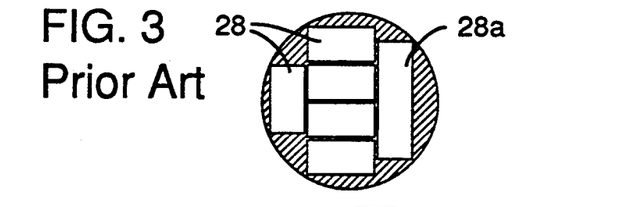
FIG. 3 is similar to FIG. 2, but where the initial cuts made in the log are assumed to be offset 0.3 inches to the left of those shown in FIG. 1.

For example, referring to FIG. 1, the computer may determine that the log 18 shown should be cut along paths 12-16, thereby producing standard-shaped slabs known as a cant 20 and a flitch 22. These slabs are then cut again to produce the standard-sized boards 24 indicated in FIG. 2. Alternatively, the computer may determine that when making the cut the centerline of the cant should be offset from the centerline of the log by a predetermined distance 26 (FIG. 1) such as 0.3 inches. This may yield, after further processing, the collection of standard-sized boards 28 indicated in FIG. 3. Comparing FIGS. 2 and 3, it will be recognized that the computer-selected offset implemented in FIG. 3 has yielded increased value because a more valuable 2×6 board 28a (FIG. 3) has been substituted for a less valuable 2×4 board 24a (FIG. 2). This difference in yield can conveniently be expressed as a difference in fair market price for the finished-cut lumber. Accordingly, by reading the measured dimensions of a particular log, in advance of processing, the computer can be used to select the cutting options that offer the highest projected yield and to project the yield available from particular purchased lots of timber.

The difficulty with existing systems, however, is that frequently the computer will project a yield for a given cutting option that does not match the overall yield that is actually realized when the cutting option is implemented. This mismatch between theory and practice occurs because of system uncertainty associated with either measurement, modeling, or implementation.

For example, measured values may be faulty due to poor calibration of the scanning equipment, poor mechanical presentation of the wood to the sensor, or poor mounting of the wood on the conveying system. In particular, instead of a headrig carriage, often a sharp chain conveyor is used which holds the log on spikes that project from a moving chain. While this setup permits the log to be measured along two axes, often the log will rock on the chain as it travels through the scan zone. Similarly, a flitch riding on a flatchain conveyor may slip during the measurement process.

Figure 4:
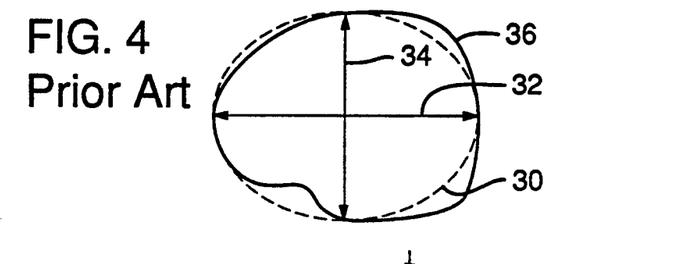
FIG. 4 is a transverse sectional view, in accordance with the prior art, schematically showing how the actual profile of a log may differ from its elliptical model.

Modeling error arises because the set of dimensional parameters derived by the computer, in accordance with its model and whatever number of measurements are practical, may not accurately reflect the true dimensions of the log. In the above-described set-up, for example, based on its circular model, the computer assumes that the vertical dimension of the log is equal to its measured horizontal dimension but, in fact, the log may be elliptical in shape. Referring to FIG. 4, even if the computer assumes an elliptical model 30 and bases its derived values on measurements taken along two axes 32 and 34, there are still likely to be deviations in the true shape 36 of the log from the model. Other types of modeling error can arise when the bark is left on the log so that the thickness of the underlying wood can only be estimated. A similar type of problem occurs if the log is known to consist of a layer of premium-grade material surrounding a core of standard-grade material and the thickness of the premium-grade material is uncertain.

Implementation error results because the cutting option specified by the computer may not be carried out exactly in the manner envisioned. For example, after a flitch has been scanned and its optimal cut identified, the sloped edge 38 or "wane" of the flitch (FIG. 1) may be crushed a bit as it is positioned on the in-feed table of the automated edger. The edger then cuts the flitch at the computer-specified distance, but with reference to this crushed edge instead of to the original edge, thereby producing an offset from the cutting path envisioned. Alternatively, a manual edger may follow the headrig, and the edgerman may choose to edge the flitch in a way different than that envisioned by the headrig computer.

Figure 5:
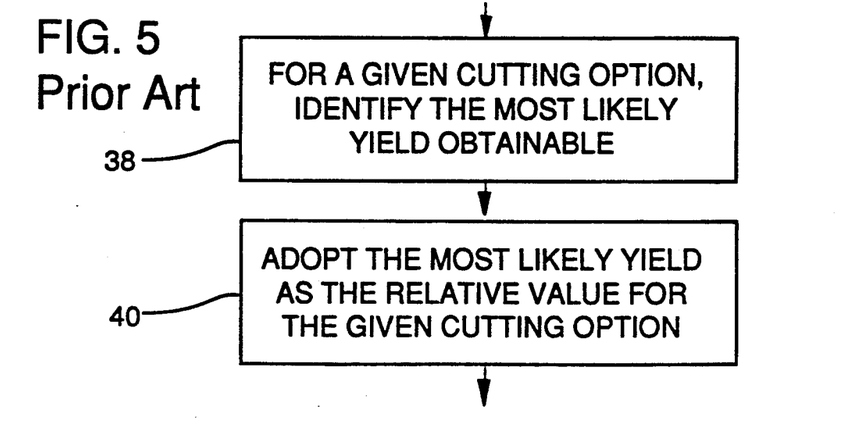
FIG. 5 is a block diagram representing the conventional method for determining the value of a given cutting option.

In existing optimization systems, to deal with the inherent uncertainties involved, it has been the practice, in projecting yield, to rely on the most likely set of events. Usually this is done implicitly, without any added computational effort, as part of the basic assumptions used in writing the program for the computer. In the above-described setup, for example, the computer relies on the assumption that the most likely cross-sectional profile of the log is a circle. Although some of the logs will, in fact, have a vertical dimension falling far short of their horizontal dimension, and some of the logs, will, in fact, have a vertical dimension far exceeding that of their horizontal, it is generally believed that, on balance, such deviations will tend to average out and that many of the logs will most likely have a vertical dimension about equal to their horizontal. Relying on such assumptions, existing systems compute the most likely yield for a given cutting option and adopt such yield as the relative value of that cutting option. This approach to determining the value of a given cutting option is summarized in blocks 38 and 40 of FIG. 5.

Despite the apparent reasonableness of this approach, however, it has often been found, in actual practice, that when the optimized cutting solutions are actually implemented, the overall yield actually realized deviates significantly from that projected by the optimization system. Moreover, it has also been found that manual operators, in deviating from the "optimal" cutting solution selected by the computer, will sometimes produce overall yields that are higher than those obtained when the cutting solution was followed.

Accordingly, an object of the present invention is to provide an improved method of optimizing the overall yield of useful material cut from a piece of raw material.

A related object of the present invention is to provide a method for projecting the yield of a batch of logs where such yield will closely match the overall yield that is later obtained once the logs are actually cut.

Another related object of the present invention is to provide a method for identifying which of a number of cutting options will actually produce the highest overall yield in practice.

Yet another related object of the present invention is to provide a method of compensating for the specific underlying conditions affecting the yield in a given system.

Still another object of the present invention is to achieve a more effective blending of automated systems and manual systems in the same factory.

SUMMARY OF THE PRESENT INVENTION

Whereas existing systems project yield based on the most likely yield as calculated from the most likely conditions, the present system projects yield based on a number of possible yields where the probability of obtaining each possible yield is statistically determined. This has been found to produce superior projections which correlate closely with the average yield actually obtained once the proposed cutting solutions are implemented.

The specific steps involved in the method include selecting different possible cutting options for cutting the piece of raw material, identifying for each cutting option the numerically different possible outcomes or yields obtainable, and determining for each possible yield the relative probability of obtaining such a yield. The relative projected value for each cutting option is then determined by combining the possible yields for the cutting option with the relative probabilities corresponding to these yields. After the relative projected values of the cutting options are compared, normally the largest projected value is selected and the raw material is cut in accordance with the corresponding cutting option.

Preferably a statistically weighted average is used for determining the relative projected value of a given cutting option. That is, the average value of the possible yields is calculated where each possible yield has been weighted by its corresponding relative probability.

Preferably, also, the probability of obtaining each possible yield is determined by empirical measurement. This may begin by identifying a set of uncertain variables that affect the possible yields obtainable and by empirically measuring the statistical attributes of this set over a valid sampling base. These statistical attributes are then available for use in the optimization process. In the optimization process, the statistical attributes are used to predict the possible yields and the relative probability of each possible yield for a given cutting option. The prediction of the possible yields is done by analyzing the range of the uncertain variables. The prediction of the relative probability of each possible yield is done by analyzing the range and distribution of the uncertain variables. This is done by grouping the uncertain variables each in a respective class corresponding to a respective one of the possible yields. The actual relative frequency of each of these classes is then determined in accordance with the measured attributes of the underlying set, and the relative probability of obtaining each possible yield is equated with the actual relative frequency of each class corresponding to that yield. If empirical measurements are not feasible, however, the relative probabilities can be predicated, in the first instance, on attributes that are generated to fit a statistically expected distribution (e.g., that fit a normal or "Gaussian" curve).

DESCRIPTION OF THE PREFERRED EMBODIMENTS

Figure 6:
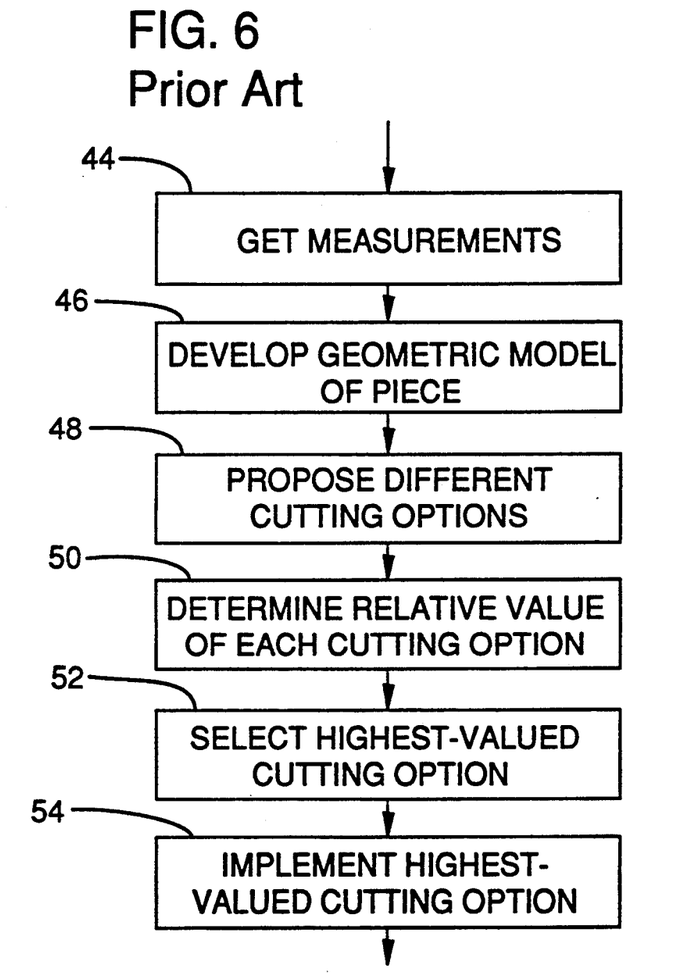
FIG. 6 is a block diagram identifying the general steps performed in a conventional computer-based optimization system.

FIG. 6 is a diagrammatic overview of the sequence of operations that are performed in a conventional computer-based optimization system. Recalling the particular setup described in the Background section, for example, a measurement of the horizontal axis of the log was made (block 44), the remaining dimensions of the log, including the vertical, were determined based on a circular model (block 46), different cutting options were considered in the light of their computer-determined value (blocks 48 and 50), and the highest-valued cutting option (e.g., the one most likely to produce a more valuable 2×6 instead of a less valuable 2×4) was selected and implemented (blocks 52 and 54). Although the present invention differs from existing systems in the particular steps that it uses to determine the value of a given cutting option (block 50), the overall sequence is otherwise the same so that the present invention is readily incorporated into existing optimization systems.

Figure 7:
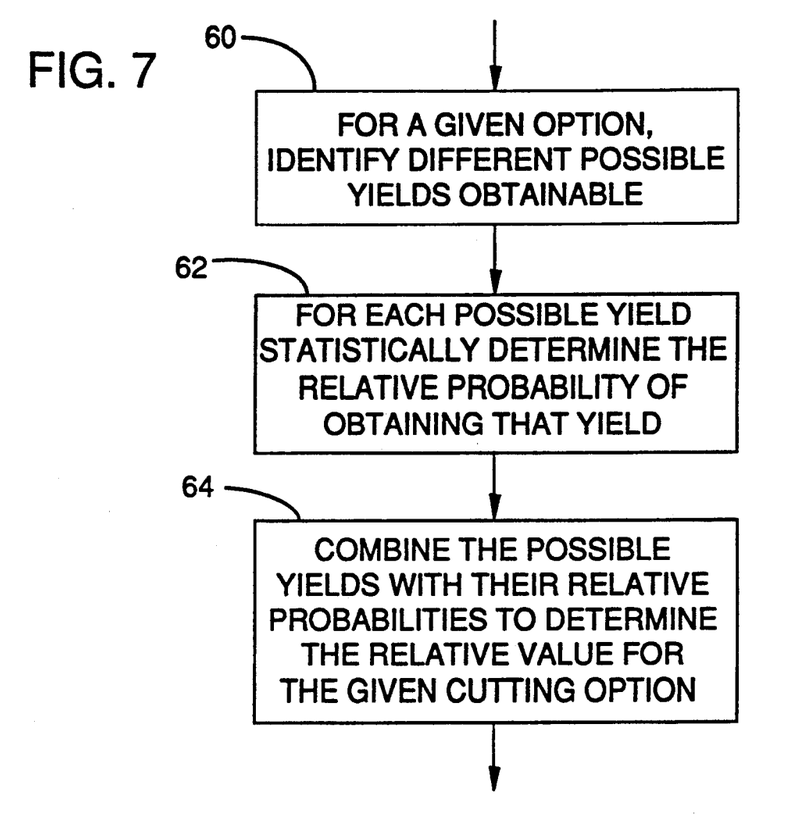
FIG. 7 is a block diagram representing an exemplary method, in accordance with the present invention, for determining the value of a given cutting option.

FIG. 7 is a diagrammatic overview of the steps that are used in computing the relative value of a given cutting option in accordance with the exemplary method of the present invention. As shown, for each given cutting option, the different possible yields that can be obtained are first identified (block 60). Next, the relative probability of obtaining each possible yield is statistically determined (block 62), and the possible yields are combined with their corresponding relative probabilities to determine the relative value for the given cutting option (block 64). These steps will now be described in greater detail with reference to the particular setup earlier described in the Background section.

Referring to FIG. 1, the optimization problem presented in this earlier setup was one of determining, in making the cuts, how much offset 26 should exist between the centerline of the cant 20 and the centerline of the log 18 so as to achieve the highest valued yield. It will be assumed that there are five different distances or "offsets" being proposed. That is, offsets of 0.0, 0.1, 0.2, 0.3, and 0.4 inches (block 48, FIG. 6). It will also be assumed that the log 18 was measured as being 9.9 inches across its horizontal axis 23 (block 44, FIG. 6). Other assumptions that will be made are that only 2×4 or 2×6 boards have value, that each board is actually full-size (e.g., is exactly 2×4 inches), that these values can be characterized in monetary terms as $1.20 for a 2×4 and $1.80 for a 2×6, that no wane 38 is permitted on the finished boards, that all "kerfs" (e.g., wood removed by the cutting process) are 0.2 inches wide, and that taper of the log is unimportant given that its length is only 8 feet and given that measurements are made from the small end of the log.

Finally, it will be assumed, as initially determined through empirical measurement in accordance with the present invention, that the vertical dimension of any given log actually lies within the range of 90% to 110% of its horizontal dimension. Accordingly, the log specified above, having a 9.9 inch horizontal dimension, can have, as its vertical dimension 27, any measurement between 8.91 and 10.89 inches.

In determining the value of the 0.0 inch offset relative to the other offsets, it might be reasoned that 9.9 inches is centered between 8.91 and 10.89 inches and that for any given log having the assumed horizontal dimension, the actual vertical dimension of that log will most likely be closer to 9.9 inches than to any other dimension. Such reasoning would logically result in the use of a circular model to describe the log (block 46, FIG. 6), and the computed yield would be four 2×4's from the center cant and one 2×4 from each flitch, as shown in FIG. 2, for a total price-based value of $7.20. This is the approach to determining relative value (block 50, FIG. 6), that is adopted in conventional systems (blocks 38–40, FIG. 5).

In the exemplary method of the present invention, however, the first step taken is to identify each of the different possible yields that can actually be obtained when the 0.0 offset is used (block 60, FIG. 7). Based on an elliptical model, and for the range of vertical dimensions that can actually occur (e.g., 8.91 to 10.89 inches), it is computed that there are two possible yields 66 and 68 that can be obtained as shown, respectively, in FIGS. 8a and 8b. Comparing FIGS. 8a and 8b it will be seen that one possible yield 66 (FIG. 8a) produces only three 2×4's from the center cant and has a price value (flitches included) of $6.00, whereas the other possible yield 68 (FIG. 8b) produces four 2×4's from the center cant and has a price value of $7.20.

Figure 8A:
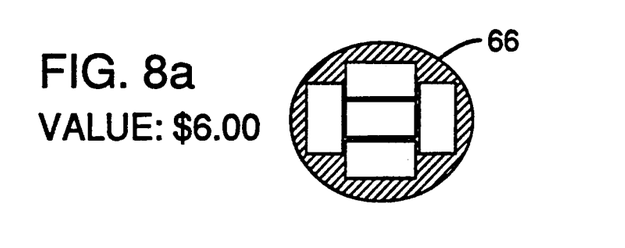
FIGS. 8a-8b are transverse sectional views identifying, based on an elliptical model and in accordance with the exemplary method of the present invention, different possible yields obtainable from logs having a predefined horizontal dimension and a vertical dimension falling within a known range.
Figure 8B:
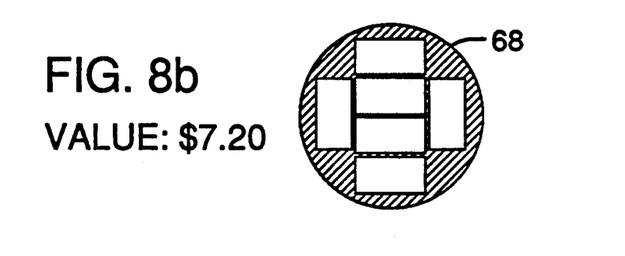

The next step in the exemplary method of the present invention is to statistically determine the relative probability of obtaining the yields that are shown in FIGS. 8a and 8b (block 62, FIG. 7). This can be done by following the steps outlined in FIG. 9.

Figure 9:
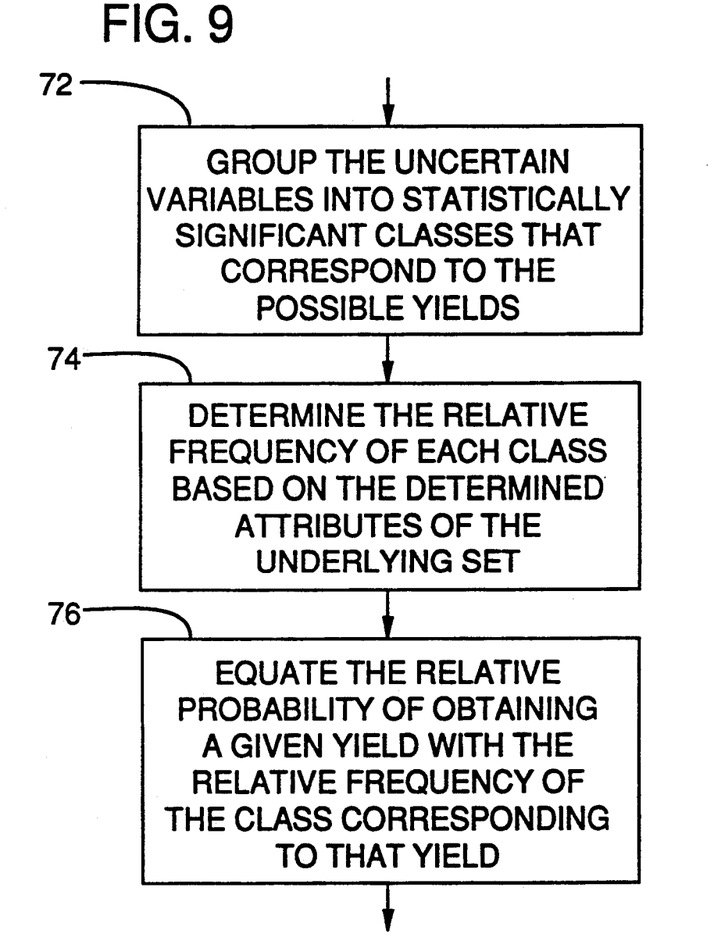
FIG. 9 is a block diagram representing an exemplary method, in accordance with the present invention, for determining the relative probabilities of obtaining different possible yields.
Figure 11:
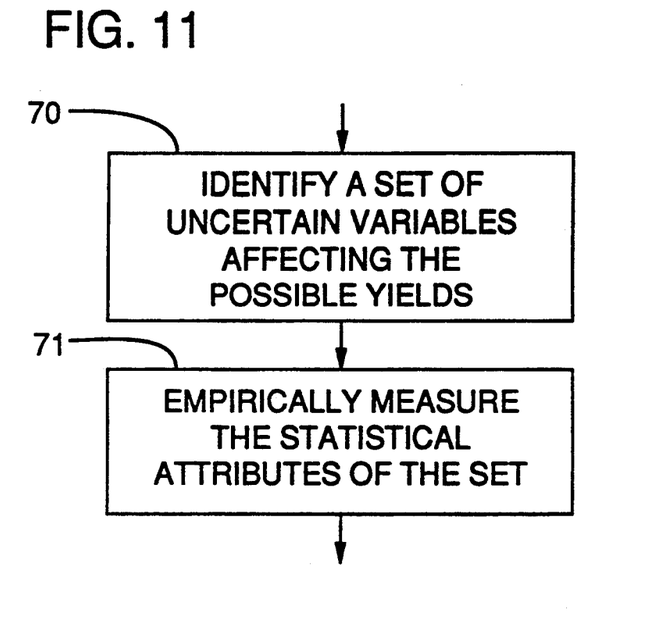
FIG. 11 is a block diagram of an exemplary method in accordance with the present invention for determining the statistical attributes used in the optimization process.

Before discussing FIG. 9, it will be recognized that whether the actual yield is as shown in FIG. 8a or, instead, as shown in FIG. 8b will be affected by what, specifically, the vertical dimension 27 of the log actually is (block 70, FIG. 11). Stated differently, a functional relationship exists such that the actual yield obtained is a function of the uncertain vertical dimension. In accordance with the preferred method shown in FIG. 11, the statistical attributes of this uncertain vertical dimension are empirically measured (block 71). For example, empirical measurements may show that the vertical dimension is just as likely to be 90% of the horizontal dimension as to be 91%, just as likely to be 91% of the horizontal dimension as to be 92%, and so on. Based on these types of measurements, it will now be assumed, for purposes of this example, that the vertical dimension not only lies within the range of 90% to 110% of its horizontal dimension, but also occurs within each similarly-sized subinterval of this range with equal or "uniform" relative frequency. Of course, in making these measurements, care should be given to obtaining a valid sampling base, that is, to making sufficient measurements to validly characterize the relative frequency of each subinterval.

It will be recognized that the assumption implicit in this type of frequency distribution, that each separate value of vertical dimension is equally likely, may or may not be true in a given system. If, for example, the logs are initially loaded onto the conveyor in such a way that their center of mass is allowed to settle, before clamping, to the lowest height available, this will tend to result in measurements of vertical dimension in which the lower values predominate. The growing conditions of a particular lot of timber are another factor which can favor the predominance of certain dimensional values. The difficulty of identifying, in advance, which factors might systematically influence the relative frequency of each interval underscores the importance of making measurements under the conditions as they actually exist in the system.

Based on the above-assumed range for the uncertain vertical dimension, 8.91 to 10.89 inches, the measured value of the horizontal dimension, 9.1 inches, and an elliptical model, the computer is able to group each of the potential values of vertical dimension into two statistically significant classes where the uncertain variables in the first class relate to the yield 66 shown in FIG. 8a and the uncertain variables in the second class relate to the yield 68 shown in FIG. 8b (block 72, FIG. 9). The classes are statistically significant insofar as it is their relative frequency, and not the relative frequency of each subinterval or separate value of vertical dimension, that is ultimately needed to determine the actual probability of obtaining each particular yield. For the specific values given, it is found that vertical dimensions of between 8.91 and 9.40 inches produce the yield 66 shown in FIG. 8a and, accordingly, fall in the first class, while vertical dimensions of between 9.40 and 10.89 inches produce the yield 68 shown in FIG. 8b and, accordingly, fall in the second class.

After grouping the uncertain variables into distinct classes, the next step is to determine the relative frequency of each class based on the statistical attributes of the uncertain variable (block 74, FIG. 9). In the present setup, for example, where it has been assumed that each separate subinterval or value of vertical dimension is equally likely, vertical dimensions of between 8.91 to 9.40 inches will occur at a relative frequency of 25% and vertical dimensions of between 9.40 and 10.89 inches will occur at a relative frequency of 75% (8.91 to 9.40 representing 25% of the entire range of values and 9.40 to 10.89 representing 75%).

In the present example, it will be recognized that if the horizontal dimension were measured as being 9.7 inches instead of 9.9 inches, although this would likely change the yields found to be possible (block 60, FIG. 7), and the groups found to correspond to these yields (block 72, FIG. 9), the statistical attributes of the uncertain vertical dimension (block 71, FIG. 11) would not change, insofar as the vertical dimension remains just as likely to be 90% of the horizontal dimension as to be 91%, and so on, as before. Accordingly, the empirical measurements made in the method of FIG. 11 (block 71) need to be made only once and will remain valid regardless of what horizontal dimension is being measured for the log or what cutting option is being considered.

Continuing to proceed as outlined in FIG. 9, the final step taken in determining the relative probability of obtaining a given yield is to equate such relative probability with the relative frequency of the class corresponding to that yield (block 76). Accordingly, in the specific example being considered, the relative probability of obtaining the possible yield 66 shown in FIG. 8a, which corresponds to vertical dimensions between 8.91 and 9.40, is determined to be 25%, while the relative probability of obtaining the possible yield 68 shown in FIG. 8b, which corresponds to vertical dimensions between 9.40 and 10.89, is determined to be 75%.

Referring to block 64 of FIG. 7, to determine the relative value of the 0.0 offset cutting option, the possible yields shown in FIGS. 8a and 8b are combined with their relative probabilities. In particular, a statistically weighted average is preferably computed so that the average value of the possible yields is calculated where each possible yield has been weighted by the relative probability of obtaining that yield. This derivation can be mathematically expressed in the following form:

$$V = \sum_{j=1}^{n} Y_j P_j \quad (1)$$

Here V is the relative value of a given cutting option, n is the number of different yields that are possible for that cutting option, j is a bounded integer, $Y_j$ is the potential value of the jth possible yield, and $P_j$ is the relative probability of obtaining the jth possible yield. Substituting in this expression the specific values given, the relative value of the 0.0 offset cutting option is determined to be $$V = 0.75 \times \$7.20 + 0.25 \times \$6.00 = \$6.90$$

Compared with the $7.20 value earlier determined using a conventional approach, this $6.90 value is a more realistic measure of the value of the 0.0 inch offset, as it takes into account, statistically, the full range of possible vertical dimensions that can occur over the course of processing many logs and not just the one that is the most likely.

Figure 10:
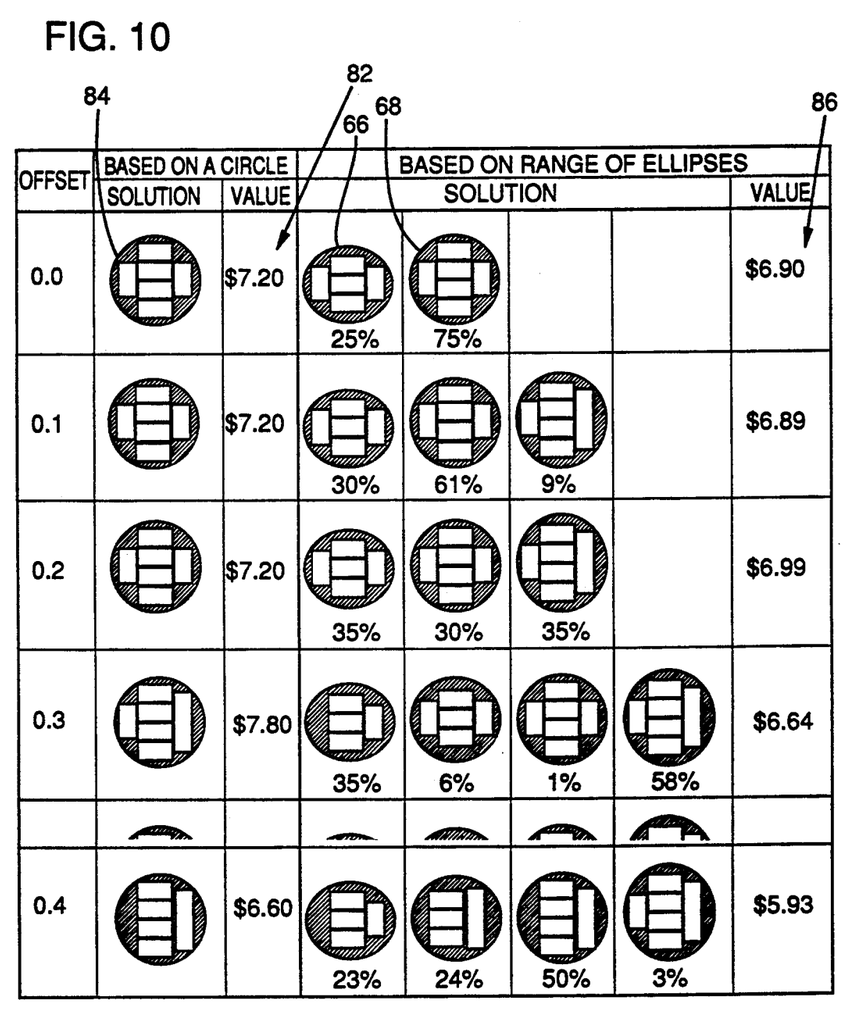
FIG. 10 is a table listing, for different cutting options, projected values of yield, where the values of yield in the left half of the table are conventionally determined by the most likely yield obtainable as shown schematically, and the values of yield in the right half of the table are determined, in accordance with the present invention, by a number of possible yields obtainable as shown schematically.

The described method of FIG. 7 is now repeated to determine the relative value for each remaining proposed offset, 0.1, 0.2, 0.3, and 0.4 inches (block 50, FIG. 6). The results of this operation are visually represented, in tabular format, in FIG. 10. In FIG. 10, each relative value 82 indicated in the left half of the table is derived using the conventional method and, accordingly, is the value of the single yield (e.g., 84), for the given cutting option, as predicated on a circular model. Conversely, each relative value 86 indicated in the right half of the table is derived in conformance with the exemplary method and, accordingly, is the statistically weighted value of each potential yield (e.g., 66 and 68) for the given cutting option, as predicated on a variable elliptical model. The relative probability of obtaining each possible yield (e.g., 66 and 68) is listed immediately below that yield and is used as its weighting factor.

From the table provided in FIG. 10, it will be recognized that for a given cutting option, such as that of 0.2 offset, the relative value projected by the exemplary method, $6.99, differs from that projected by the conventional method, $7.20. Given actual conditions as they are specified in this section, the value projected by the exemplary method, for a given cutting option for logs of similar horizontal dimension, is better correlated with the average value that will actually be obtained, over the course of processing many such logs, than is the value projected by the conventional method. It is reasonable, moreover, that this should be so, because the exemplary method compensates, in a statistically valid manner, for the specific underlying uncertainties affecting the yield in a given system.

The table provided in FIG. 10 further illustrates how conventional determination of the value of each proposed cutting option can lead to the selection of a less than "optimal" cutting option. In particular, the conventional method would identify an offset of 0.3 inches (e.g., corresponding to $7.80) as the highest-valued cutting option when, in fact, recognizing in accordance with the exemplary method that it is the average value over a number of logs that is important, an offset of 0.2 inches (e.g., corresponding to $6.99) is the highest-valued cutting option. Under the specific fact situation given above, this latter offset would be the one used in cutting the log according to the exemplary method (block 54, FIG. 6).

Figure 12:
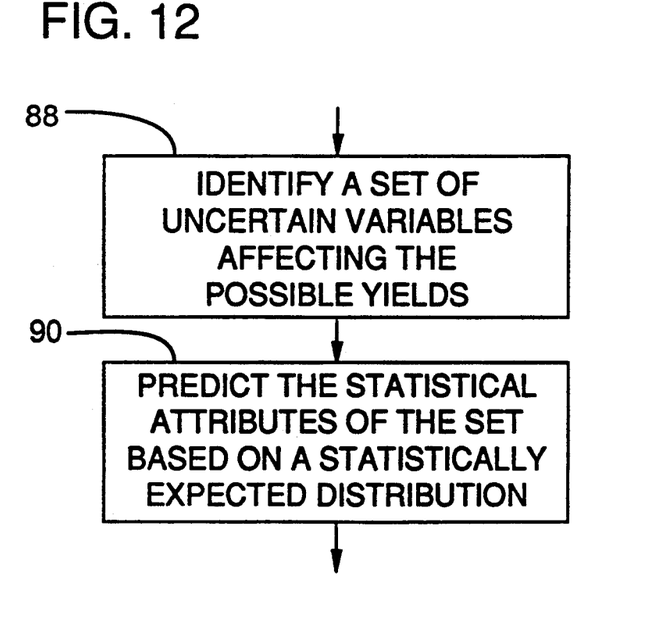
FIG. 12 is a block diagram similar to FIG. 11 except showing an alternative method for determining the statistical attributes.

As mentioned, FIG. 12 shows an alternative approach to that of FIG. 11 for determining relative probabilities. Here, consistent with the discussion of FIG. 11, it is assumed that the log has a measured horizontal dimension of 9.9 inches, an unknown vertical dimension of between 8.91 and 10.89 inches, and that a cutting offset of 0.0 is being considered, leading to identification, by the computer, of two possible yields 66 and 68 as shown in FIGS. 8a and 8b. Tracking the first step in FIG. 11, the first step of the method in FIG. 12 is recognizing that the particular value assumed by the vertical dimension, within the entire set of assumable values, will affect which of the two possible yields is obtained (block 88). Unlike the second step in FIG. 11, however, the second step of the method in FIG. 12 involves predicting (not measuring) the statistical attributes of this set of assumable values based on a statistically expected distribution (block 90). For example, referring to FIG. 13, it might be predicted that over the course of many measurements the uncertain vertical dimension 27 would conform to a normal or "Gaussian" distribution 102 with a standard deviation $\sigma$ equal to one. In accordance with this model, it would be expected that if measurements were actually taken, values of vertical dimension falling in a 0.1 inch subinterval about the center of the range would be found with somewhat greater relative frequency (e.g., 10%) than would values of vertical dimension falling in a 0.1 inch sub-interval nearer to the end of the range (e.g., 2%).

Under the specific facts already provided, however, it will be recognized that the vertical dimension was understood to have a "uniform" distribution 106, where values of vertical dimension belonging to similarly-sized subintervals were said to occur with equal or uniform relative frequency (e.g., 5% for any 0.1 inch subinterval). Furthermore, this distribution was assumed to have been measured empirically. To place the method outlined in FIG. 12 in its appropriate context, it will now be assumed that the vertical dimension does indeed actually follow a uniform distribution, but that this fact is unknown to the system operator who has decided that relative frequency information is too time-consuming to separately measure despite its high predictive value. In lieu of such measurements, this operator can provisionally rely, in the manner now to be explained, on a statistically expected distribution such as the standard normal distribution 102 shown in FIG. 13.

Figure 13:
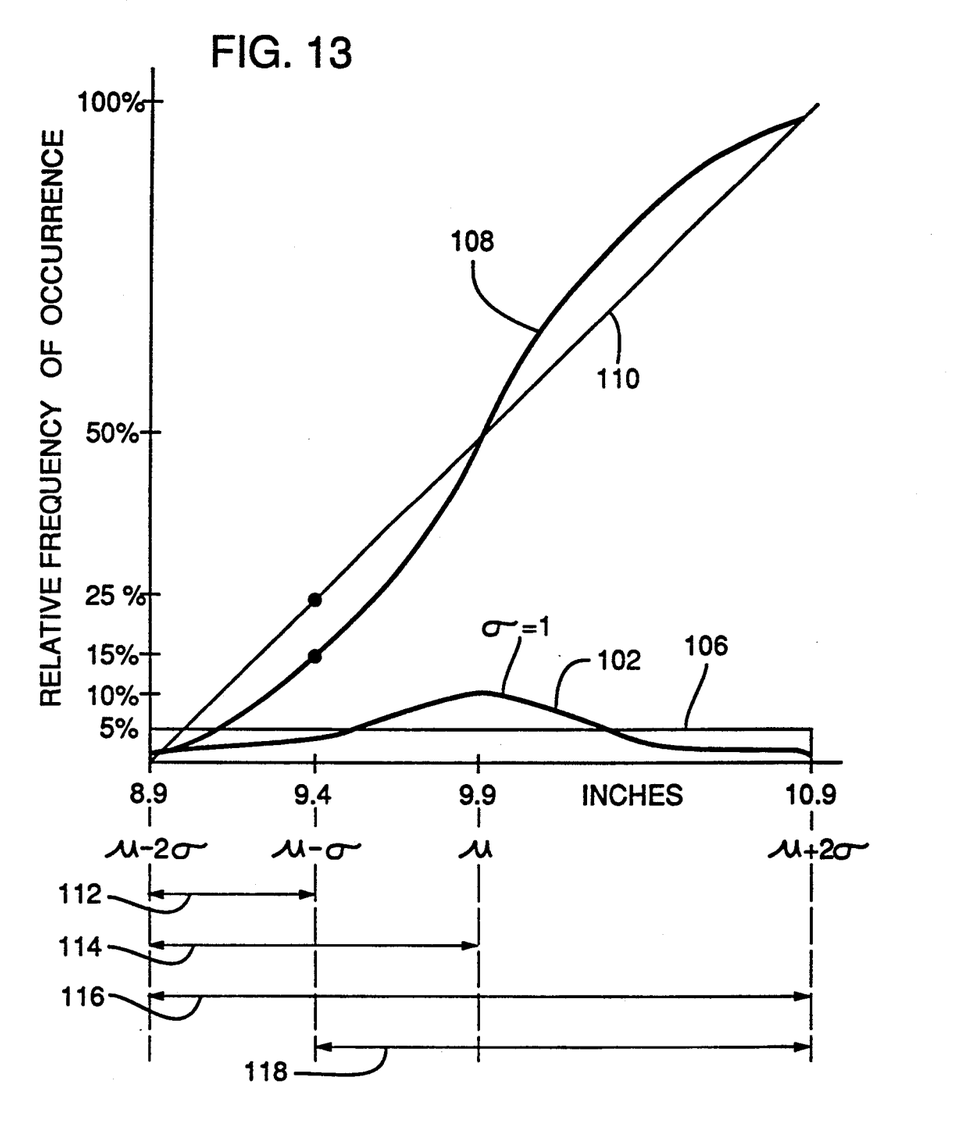
FIG. 13 is a graph showing, in heavily shaded line, the standard normal distribution and corresponding distribution function as formulated in accordance with the method of FIG. 12 together with, for comparison, a uniform distribution and corresponding distribution function.

The distribution function 108 of the standard normal distribution 102, as provided in standard texts, is shown together with the distribution function 110 of the uniform distribution 106. The distribution function 110 of the uniform distribution 106 reveals, for example, that vertical measurements "actually" occur in the interval 112, between 8.9 and 9.4 inches, with a relative frequency of 25%. This result can also be obtained by adding up the 5% relative frequencies indicated by the uniform distribution 106 for each underlying 0.1 inch subinterval. For the interval 114, between 8.9 and 9.9 inches, the actual relative frequency is 50%, and in the interval 116, between 8.9 and 10.9 inches, it is 100%. In accordance with standard mathematical theory, moreover, the actual relative frequency of vertical measurements in the interval 118, between 9.4 and 10.9 inches, is given by the actual relative frequency of vertical measurements in the interval 116 minus the actual relative frequency of vertical measurements in the interval 112, or 75%. In FIG. 13, intervals or "classes" 112 and 118, as before, correspond to the different yields that are shown in FIGS. 8a and 8b, respectively (refer to the discussion of block 72).

The distribution function 108 of the standard normal distribution 102 is interpreted in like manner to determine a "predicted" relative frequency of vertical measurements within interval 112 of 16% and within interval 118 of 84% (blocks 72-74). Although, under the facts given, these predicted relative frequencies do not match the actual relative frequencies earlier derived, nor would they typically, for the purposes of carrying out step 76 in the method of FIG. 9, they are provisionally accepted as being valid. As before, the possible yields (e.g., $6.00 and $7.20) are statistically weighted by their relative probabilities (e.g., 16% and 84% as here predicted) to determine the relative value, $7.00, for the 0.0 cutting option (block 64, FIG. 7). The remaining steps are the same as described in connection with FIG. 9.

From the foregoing discussion, the various uses that are made of statistical methods in optimizing yield in accordance with the present invention will be recognized. Statistical methods are used, for example, in determining an accurate value for yield from a statistically weighted average of two or more possible or potential yields. Statistical methods are used in grouping the uncertain variables affecting yield into statistically significant classes where the variables in a particular class correspond to a possible yield. Statistical methods are used in characterizing the set of uncertain variables by statistical attributes whether such attributes are empirically measured or whether, instead, they are based on a statistically expected distribution.

Although an example of practicing the exemplary method of the present invention has been described in a particular application, it will be recognized that the method of the invention is readily adaptable to many other applications. In particular, under the facts assumed, the only uncertainty was the unmeasured dimension of the log, but the method of the present invention is equally useful in compensating for uncertainty arising from measurement or implementation. With measurement uncertainty, for example, the functional relationship between various calibration errors and possible yields could be formulated, and the relative probabilities of obtaining the possible yields could be determined as described herein. With implementation uncertainty, the underlying variable might be characterized in terms of the degree of crushing that occurs to the edge of a flitch as it is manually positioned on the infeed table of an edger. Moreover, by properly combining relative probabilities, more than one uncertain variable can be compensated for at a time so as to permit, for example, predictive modeling based on nonelementary shapes and compensation for the uncertainty arising when multiple sources of uncertainty occur together.

Moreover, the use of the invention is not limited to the wood products industry, but may be applied to optimize the yield of useful material cut from any raw material.

Finally, although various parameters in the given example were characterized as having particular units, other forms of characterization can be equally valid. For example, although the value of potential yield was characterized in terms of a price, as derived from the market price of each standard-sized board obtained, it would have been equally valid to characterize yield in terms of board-feet of saleable lumber recovered or even in terms of some unitless number given meaning by its relative location on a preassigned scale.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of optimizing the yield of useful material cut from a piece of raw material, said method comprising:
    (a) considering different possible cutting options for cutting said piece of raw material;
    (b) for each of said possible cutting options identifying different possible yields obtainable from the respective cutting option;
    (c) determining for each respective possible yield a corresponding relative probability of obtaining said respective possible yield including identifying a set of uncertain quantitative variables tangibly affecting said possible yields;
    (d) determining a relative value for each of said possible cutting options by combining the respective possible yields obtainable from the respective cutting option as identified in step (b) with the relative probabilities corresponding to such yields as determined in step (c);
    (e) comparing the respective relative values of the respective possible cutting options, as determined in step (d), with one another and selecting an optimal one of said relative values; and
    (f) cutting said piece of raw material in accordance with the respective cutting option which corresponds to said optimal one of said relative values.

2. The method of claim 1 wherein step (d) includes determining the relative value by calculating for each respective possible cutting option a statistically averaged value of the respective possible yields corresponding to said respective possible cutting option so that each respective possible yield is weighted by said relative probability determined for such yield in step (c).

3. The method of claim 1 wherein step (c) includes determining at least two different relative probabilities.

4. The method of claim 1 further including equating said set of uncertain quantitative variables with a set of uncertain dimension-related variables.

5. The method of claim 4 further including characterizing an uncertain dimension of said piece of raw material by a plurality of potential magnitudes and equating said set of uncertain dimension-related variables with said plurality of potential magnitudes.

6. The method of claim 5 wherein step (c) includes grouping said plurality of potential magnitudes into respective classes for each respective possible cutting option so that the potential magnitudes in each class correspond to a respective one of the possible yields corresponding to said respective possible cutting option.

7. The method of claim 6 wherein step (c) includes determining a respective relative frequency for each of said respective classes.

8. The method of claim 5 including selecting a reference magnitude and basing said plurality of potential magnitudes on different respective percentages of said reference magnitude.

9. The method of claim 8 including obtaining a measurement of a second dimension of said piece of raw material and equating said reference magnitude with said measurement.

10. A method of optimizing the yield of useful material cut from a piece of raw material, said method comprising:
    (a) considering different possible cutting options for cutting said piece of raw material;
    (b) for each of said possible cutting options identifying different possible yields obtainable from the respective cutting option;
    (c) determining for each respective possible yield a corresponding relative probability of obtaining said respective possible yield including identifying a set of uncertain variables affecting said possible yields and empirically measuring respective statistical attributes of said set;
    (d) determining a relative value for each of said possible cutting options by combining the respective possible yields obtainable from the respective cutting option as identified in step (b) with the relative probabilities corresponding to such yields as determined in step (c);
    (e) comparing the respective relative values of the respective possible cutting options, as determined in step (d), with one another and selecting an optimal one of said relative values; and
    (f) cutting said piece of raw material in accordance with the respective cutting option which corresponds to said optimal one of said relative values.

11. The method of claim 10 wherein step (c) further includes the step of grouping said uncertain variables into respective statistically significant classes so that the uncertain variables in a respective said class each correspond to a respective one of said different possible yields.

12. The method of claim 11 wherein step (c) further includes the step of determining a respective relative frequency for each class in accordance with said statistical attributes.

13. The method of claim 12 wherein step (c) further includes the step of equating the relative probability of obtaining a respective possible yield with the relative frequency determined for the class that corresponds to said respective possible yield.

14. A method of optimizing the yield of useful material cut from a piece of raw material, said method comprising:
    (a) considering different possible cutting options for cutting said piece of raw material;
    (b) for each of said possible cutting options identifying different possible yields obtainable from the respective cutting option;
    (c) determining for each respective possible yield a corresponding relative probability of obtaining said respective possible yield including identifying a set of uncertain variables affecting said possible yields and predicting respective statistical attributes of said set;
    (d) determining a relative value for each of said possible cutting options by combining the respective possible yields obtainable from the respective cutting option as identified in step (b) with the relative probabilities corresponding to such yields as determined in step (c);

(e) comparing the respective relative values of the respective possible cutting options, as determined in step (d), with one another and selecting an optimal one of said relative values; and (f) cutting said piece of raw material in accordance with the respective cutting option which corresponds to said optimal one of said relative values.

15. The method of claim 14 wherein step (c) further includes the step of grouping said uncertain variables into respective statistically significant classes so that the uncertain variables in a respective said class each correspond to a respective one of said different possible yields.

16. The method of claim 15 wherein step (c) further includes the step of determining a respective relative frequency for each class in accordance with said statistical attributes.

17. The method of claim 16 wherein step (c) further includes the step of equating the relative probability of obtaining a respective possible yield with the relative frequency determined for the class that corresponds to said respective possible yield.

* * * * *